Figures 1, 2, 3, 4:
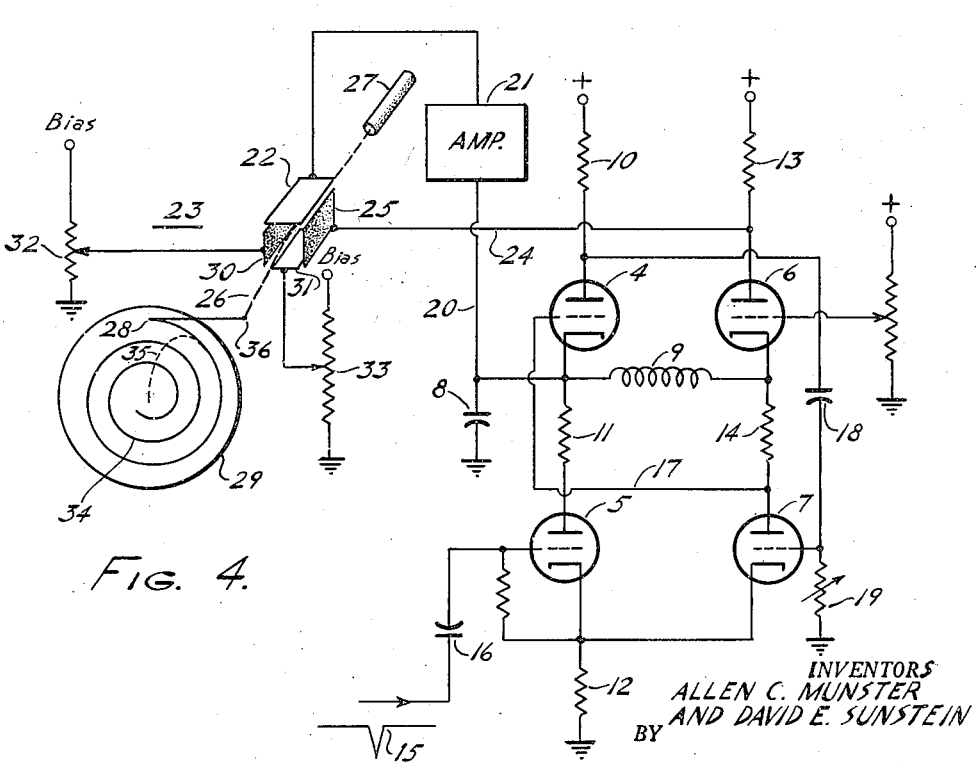

Patented Dec. 20, 1949

2,491,684

UNITED STATES PATENT OFFICE 2,491,684

DEFLECTING SIGNAL GENERATOR

Allen C. Munster, Philadelphia, and David E. Sunstein, Cynwyd, Pa., assignors to Philco Corporation, Philadelphia, Pa., a corporation of Pennsylvania Application November 8, 1946, Serial No. 708,540

7 Claims. (Cl. 315—24)

This invention relates to sweep signal generators for cathode ray tube and like circuits. More particularly it relates to methods of and means for generating sweep signals for application to the deflecting elements of a cathode ray tube to deflect the cathode ray beam and to cause it to describe a spiral trace on the screen of the tube. It also relates to a particular form of sweep signal for application to the deflecting elements of a cathode ray tube to produce such a trace.

The invention is particularly applicable in a radar moving target indicator system of the so-called storage type. In such a system it is required to store or preserve, for more or less extended periods of time, information contained in an electrical wave signal which varies as a function of time throughout intervals of appreciable duration. Such periods of storage may, in general, be comparable in duration to the intervals during which the information to be preserved occurs. The durations of these intervals may correspond to the pulse repetition period of the radar system, which, for a typical system, may be of the order of 500 microseconds.

A convenient method of achieving such storage is to provide a cathode ray tube whose electron beam is caused, by the application of locally generated deflecting signals, to scan a suitably retentive screen or mosaic in a predetermined systematic manner. The signal to be stored is then caused to modulate either the deflection or the intensity of the electron beam, whereby the intelligence contained in the signal is transferred to the screen in the form of a persistent trace, a characteristic of which varies throughout its length in the same way that the corresponding characteristic of the signal varied as a function of time. At some later time the trace thus formed may again be scanned (e. g. by an electron or light beam) to reconstruct a signal corresponding to the one which was used to produce the trace.

Alternatively, in one type of moving target indicator hereinafter referred to as the storage and subtractive type, it may be desirable to compare the stored signal with a subsequent radar signal which differs from the first signal owing to the motion of targets in the interim, and to derive directly a signal indicative of differences between the two signals. To this end the two signals are caused successively to deflection-modulate the normal scans produced by locally generated deflecting signals. It is known that differences in the traces thus produced will cause charges to be induced in a capacitor plate located adjacent the screen on which the trace is produced. Thus there may be derived signals indicative of differences between the earlier and later signals produced by target motion.

Because the information to be stored may extend over a relatively long interval of time, and in order to preserve the information as accurately as possible, it is desirable to provide, in a single cathode ray tube used for storage purposes, as long a trace as possible. However, to avoid ambiguity and confusion, it is essential that the trace be not permitted to intersect itself during any storage period and that a predetermined relatively uniform spacing be maintained between different portions of the same trace which are proximate one to the other. A further requirement is that there should be no sharp discontinuities in the trace produced. A trace which satisfies these requirements and which permits maximum utilization of the available screen area is one of spiral form.

Moreover, in a system of the storage and subtractive type above referred to, successive traces are usually initiated in response to the pulses which control the transmission of radar pulses of high frequency energy. The spacing of these controlling pulses will generally vary somewhat, and it is essential, despite this variation, that subsequently produced traces should coincide almost identically with those previously produced. To this end it is necessary to produce, at arbitrarily different times, deflecting signals which are substantially identical in form and amplitude.

In the past, deflecting signals for producing a spiral trace of gradually diminishing amplitude have been generated by successively applying impulses of current to a pair of parallel tuned circuits to produce damped sine-wave signals. By appropriately timing the application of the impulses, these signals could be maintained in more-or-less phase quadrature relationship suitable for application to the horizontal and vertical deflecting plates respectively of a conventional electrostatically-deflected cathode ray tube to produce the desired spiral trace. However, because of the inherent resistance of the means used to apply an impulse of current to a parallel tuned circuit, some finite time is required to charge the condenser thereof. As a result, the electron beam, which is initially at rest at the center of the tube, requires a finite time to be deflected to the external periphery of the tube screen, at which point it is desired to commence the storage trace. This makes it difficult to synchronize the inception of the sweep with the occurrence of a pulse which controls the operation of the radar transmitter.

Furthermore, if, as above suggested, the same parallel resonant circuit is to be successively shock-excited in response to control pulses which tend to occur aperiodically, the conditions existing in the resonant circuit upon successive excitations will differ. This will give rise to undesirable variations in the phases and amplitudes of the deflecting signals generated.

In accordance with the invention, the cathode ray beam is normally deflected away from the central axis of the tube. At the desired instant, suitable deflecting forces are applied to produce a spiral-conical scan of diminishing amplitude. Deflecting signals adapted to produce these results, when applied to the deflecting plates of a conventional electrostatically-deflected cathode ray tube, may be derived from a circuit comprising inductance, capacitance and resistance in series. Means are provided which normally maintain a predetermined amount of energy stored in the reactive elements of the circuit. Further means are provided which are actuatable to permit this stored energy to flow in oscillatory manner in the series circuit. Owing to the presence of resistance these oscillations are damped. From the circuit there may then be derived deflecting potential waves proportional respectively to the potential across the capacitance and to the current in the series circuit. These waves will be of damped sinusoidal form and will be in substantial phase quadrature depending upon the magnitude of the resistance in the series circuit. At the termination of the sweep, the interchange of energy between the reactive elements is inhibited and preferably they are returned to their previous condition of energy storage so that the circuit will be in condition, when again actuated, to generate identical deflecting signals.

Accordingly it is the primary object of the invention to provide means for deflecting the electron beam of a cathode ray tube to produce, on the screen thereof, a spiral trace of diminishing amplitude commencing at a predetermined time at a desired point on said screen.

Another object is to provide means for producing successive spiral traces which are substantially identical in form, despite the fact that the intervals separating the initiation of successive traces may vary in duration.

Still another object is to provide a deflecting wave of particular form adapted to produce the desired trace as above defined.

Other features and advantages of the invention will become apparent from a consideration of the following specification with reference to the accompanying drawings in which Figures 1, 2 and 3 illustrate waveforms to which reference will be made in explaining the principle of the invention and the mode of operation of a representative embodiment as shown in the schematic diagram of Figure 4.

In Figure 1 the solid line represents the damped cosine waveform obtained by the customary expedient of applying a current impulse to a parallel tuned circuit at the time $t_1$. As already mentioned, because of the inherent resistance of the means used to do this, the wave does not attain its maximum positive value until a finite time later. The broken line modification represents the deflecting signal required to produce a trace commencing at time $t_1$ at a point on the external periphery of the tube, but which is unobtainable practically by this method. Likewise, as aforementioned, the amplitude and phase of successive deflecting waves generated by this expedient will vary depending on the energy remaining in the circuit at the time of its activation by a given impulse.

In Figure 2 is represented one of the two deflecting signals developed in accordance with the method of the invention by the circuit of Figure 4. It will be noted that, during the interval from $t_1$ to $t_2$ and commencing at a point 1 corresponding to maximum deflection, this signal alternates with gradually diminishing amplitude on either side of the zero-deflection level represented by broken line 2. Prior to time $t_1$ the signal is at a level corresponding to maximum deflection. Thus it will be seen to be such as will cause the beam of the cathode ray tube, to which it is applied, to be deflected to a point on the external periphery of the tube screen at time $t_1$.

Similarly, in Figure 3, there is represented the counterpart of the deflecting signal shown in Figure 2. During the interval $t_1$—$t_2$, and commencing at the zero-deflection level represented by broken line 3, this signal alternates with gradually diminishing amplitude on either side of line 3 and lags the signal of Figure 2 by approximately 90° in phase. By reason of the fact that it is derived from the same series resonant circuit as the signal of Figure 2, it will, prior to $t_1$, have a value corresponding to maximum deflection. However, at time $t_1$, this value is substantially instantaneously reduced to initiate the trace at the desired point on the cathode ray tube screen.

Referring now to Figure 4, the circuit for producing these deflecting signals comprises, basically, triode tubes 4, 5, 6 and 7, condenser 8 and inductor 9. The tubes are connected to form a circuit whose operation is similar in many respects to the conventional Eccles-Jordan or "flip-flop" circuit. Tubes 4 and 5 are normally conductive and are connected in series with resistors 10, 11 and 12 between a point of positive potential and ground. Condenser 8 is connected from the cathode of tube 4 to ground. Resistors 10, 11 and 12 and tubes 4 and 5, while they are conducting, form an effective voltage divider which operates to maintain a positive charge on condenser 8. Tubes 6 and 7 are normally non-conductive and are connected in series with resistors 13, 14 and 12 between a source of positive potential and ground. With tubes 6 and 7 cut off, no current flows through inductor 9 connecting the cathodes of tubes 4 and 6.

Upon the application of a negative triggering pulse 15 of sufficient amplitude through condenser 16 to the grid of tube 5, the latter will cease to conduct and, by reason of the resultant reduction of the current in resistor 12, common to the cathode circuits of both tubes 5 and 7, the potential of the cathode of tube 7 will be lowered sufficiently to cause it to commence conducting. Current will commence to flow through inductor 9, resistor 14, tube 7 and resistor 12. Through the action of inductor 9 in impeding such flow, the potentials of the plate of tube 7 and the cathode of tube 6 will be made instantaneously more negative. By virtue of connection 17 from the plate of tube 7 to the grid of tube 4, the latter will be cut off. Also tube 6, by virtue of the reduction in its cathode potential, will be rendered conductive.

Condenser 8 will commence to discharge through inductor 9, resistor 14, tube 7 and resistor 12. Thus there will be initiated, in the series circuit comprising condenser 8 and inductor 9, oscillations which, shortly following their inception, tend to become sinusoidal and are damped in consequence of the resistance of tubes 6 and 7 and resistors 13 and 14. The waveform across condenser 8 will be as represented in Figure 2, while the current through the series circuit will correspond to the waveform shown in Figure 3. During intervals corresponding to the more positive half-cycles of the wave of Figure 3, current will flow in the circuit comprising condenser 8, inductor 9, resistor 14, tube 7 and resistor 12, and energy will be transferred from the condenser 8 to inductor 9. During alternate half-cycles current will flow in the circuit comprising condenser 8, inductor 9, tube 6 and resistor 13, and energy will be transferred from inductor 9 to condenser 8. The phase-relation between the waves shown in Figures 2 and 3 will differ slightly from quadrature owing to resistance in the circuit. This, however, does not adversely affect the suitability of the circuit for its intended purpose.

Condenser 18, connecting the plate of tube 4 to the grid of tube 7, and resistor 19, connecting the grid of tube 7 to ground, cooperate to control the duration of the interval during which tubes 6 and 7 are conducting and during which oscillations continue in series resonant circuit 8, 9. During the conduction of tube 4, condenser 18 is charged through resistors 10 and 19 from a source of positive potential so that a certain negative bias is applied to the grid of tube 7. This bias, cooperating with the potential rise across resistor 12 in the cathode circuit of tube 7, is sufficient to maintain tube 7 cut off. When tube 4 is cut off upon the application of a negative triggering pulse to the grid of tube 5, the potential of the plate of tube 4 rises and condenser 18 commences to charge further through resistors 10 and 19. This gradually increases the negative bias on tube 7 which concurrently reduces its plate-cathode current and hence the potential developed across resistor 12. A point is ultimately reached, depending on the time constant of R. C. circuit 18, 19, at which the rise in potential across resistor 12 is insufficient to maintain tube 5 cut off. When this occurs, tube 5 again commences to conduct and the increase in current through resistor 12 raises the potential of the cathode of tube 7 so as to cause it to cut off. Simultaneously the potential on the plate of tube 7 will rise, and this rise will be transmitted through connection 17 to the grid of tube 4 to render it conductive, and through resistor 14 to the cathode of tube 6 to render it non-conductive. Tubes 6 and 7 being then cut off, oscillations in the circuit comprising condenser 8 and resistor 9 will cease, as shown in Figures 2 and 3, at the time $t_2$, and the potential across condenser 8 will soon return to the level existing prior to triggering of tube 5 by the negative triggering pulse at time $t_1$.

Thus it will be seen that the circuit just described operates normally to maintain a predetermined amount of energy stored in condenser 8. Upon actuation by the triggering pulse supplied to the grid of tube 5, interchange of energy between condenser 8 and inductor 9 is permitted. Finally, a predetermined time interval after such actuation, as determined by the time constant of R. C. circuit 18, 19, the interchange of energy is inhibited and condenser 8 is restored to its normally charged condition. This latter operation serves to restore the circuit to a predetermined standard condition preparatory to its being again actuated in response to another impulse. In this manner the operation of the circuit is rendered independent of the time elapsing between such excitations. As pointed out, the circuit is actuatable in response to a negative triggering pulse which may, for example, be derived from the pulse repetition frequency oscillator of a radar system, so that the damped train of oscillations is accurately timed to begin at the precise time at which a radar pulse is transmitted. The triggering pulse need not be of any specified duration since, as has already been pointed out, the duration of the train of oscillations is controllable by varying the time constant of R. C. circuit 18, 19 in the circuit of Figure 4.

In the circuit according to Figure 4, the potential wave across the series combination of condenser 8 and inductor 9 will have the same form as the current in the combination. As to form, therefore, this wave and that developed across condenser 8 are suitable for application directly to the horizontal and vertical deflecting plates of a conventional electrostatically-deflected cathode ray tube to produce the desired spiral sweep. However, in practice it will generally be desirable first to amplify them. In the arrangement of Figure 4 the potential across condenser 8 is supplied through connection 20, including an amplifier 21, to vertical deflecting plate 22 of a cathode ray system 23. Although the horizontal deflecting potential may be derived directly across series circuit 8, 9, it is preferably taken from the plate of tube 6 and supplied directly through connection 24 to the horizontal deflecting plate 25 of cathode ray tube system 23, whereby the need for separate amplification is eliminated owing to the presence of tube 6 functioning as an amplifier. To achieve proper centering of the trace produced by these deflecting potentials on screen 29 of cathode ray system 23, horizontal deflecting plate 30 and vertical deflecting plate 31 may be connected to appropriate sources of bias. These sources may comprise potentiometers 32 and 33 connected to suitable batteries or other sources of biasing potential. With the bias on plates 30 and 31 suitably adjusted and with deflecting signals of suitable magnitude applied to plates 22 and 25, electron beam 26, which originates in electron gun 27 will initially be deflected off screen 29 so as, for example, to intercept point 36 in the plane of the screen but outside its physical bounds.

At time $t_1$ as shown in Figure 3, there is a rapid reduction in the value of the deflecting potential applied to plate 25. which causes beam 26 to be deflected, almost instantaneously to the left so as to impinge on screen 29 at point 28—the point of commencement of the spiral scan. Commencing from this position remote from the central axis of the tube, the beam will proceed to describe, in response to the deflecting forces applied through plates 22 and 25, a spiral trace 34 whose amplitude gradually diminishes toward the center of screen 29. For applications such as that in a moving target indicator radar, as aforementioned, this form of sweep will be much superior to the sweep obtained using a waveform such as that shown in Figure 1 produced by shock-exciting a parallel tuned circuit, which causes the beam, initially at rest along the axis of the cathode ray tube and impingent at a point on the center of the screen, to proceed during some finite time to the external periphery of the screen following a trace of the sort represented at 35 in Figure 4. Moreover, as is apparent, suitable deflecting signals for this purpose may be derived from a single tuned circuit, whereby difficulties arising owing to discrepancies in the tuning of two separate circuits are avoided.

For illustrative purposes only, and with no thought of imposing any limitation upon the invention, the following typical values are given for the components of the circuit of Figure 4:

| | |
|---|---|
| Tubes 4 and 6 | Type 7F8 |
| Tubes 5 and 7 | Type 6J6 |
| Condenser 8 | 820 μμf. |
| Inductor 9 | 300 mh. |
| Resistor 10 | 33,000 ohms |
| Resistor 11 | 47,000 ohms |
| Resistor 12 | 5600 ohms |
| Resistor 13 | 33,000 ohms |
| Resistor 14 | 47,000 ohms |
| Condenser 18 | 2700 μμf. |
| Resistor 19 | 7 megohms |

It will of course be understood that the invention is susceptible of embodiment in physical forms other than the one here shown, such as will occur to those skilled in the art upon reading this specification. Accordingly, the scope of the invention is to be regarded as subject only to the limitations imposed by the appended claims.

We claim:

1. In a signal generator, inductive and capacitive reactive means, a source of energy, normally conductive vacuum tube means arranged controllably to supply energy from said source to said capacitive reactive means and operative normally to maintain a predetermined amount of said energy stored in said reactive means, a connection between said inductive and capacitive reactive means, normally non-conductive vacuum tube means for inhibiting the flow of current in said inductive means, means responsive to a triggering impulse for causing said normally conductive means to cease conducting and for causing said normally non-conductive means to conduct and permit interchange of energy between said reactive means, means for restoring said vacuum tube means to their normal conductive and non-conductive conditions to terminate said energy interchange and to restore said reactive means to their normal condition of energy storage, and means for deriving a signal which is a function of said energy interchange.

2. In a signal generator, serially connected inductive and capacitative reactive means, a source of energy, normally conductive vacuum tube means arranged controllably to supply energy from said source to said capacitive reactive means and operative normally to maintain a predetermined amount of said energy stored in said reactive means, normally non-conductive vacuum tube means for inhibiting the flow of current in said inductive means, means responsive to a triggering impulse for causing said normally conductive means to cease conducting and for causing said normally non-conductive means to conduct and permit interchange of energy between said reactive means, means for restoring said vacuum tube means to their normal conductive and non-conductive conditions to terminate said energy interchange and to restore said reactive means to their normal condition of energy storage, and means including said vacuum tube means for deriving an amplified signal which is a function of said energy interchange.

3. In a signal generator, a circuit comprising inductive and capacitive reactive elements, means normally operative to apply a potential to said capacitive element for maintaining a predetermined amount of energy stored therein, said means being actuatable to discontinue the application of said potential to said element, a connection between said inductive and capacitive reactive elements providing for the interchange of energy between said elements, means normally inhibiting the flow of current in said inductive element, said last-named means being actuatable to permit the flow of current in said inductive element, means for simultaneously actuating said potential applying means and said current inhibiting means to discontinue the application of said potential to said capacitive element and to permit the free oscillatory interchange of energy between said reactive elements, means for subsequently discontinuing the actuation of said potential applying means and said current inhibiting means to inhibit said oscillatory energy interchange and to restore said capacitive element to its normal condition of energy storage, and means for deriving from said circuit a signal which is a function of said energy interchange.

4. In a signal generator, a circuit comprising inductive and capacitive reactive elements, normally conductive vacuum tube means, said means being operative, when conductive, to apply a potential to said capacitive element for maintaining a predetermined amount of energy stored in said capacitive element and, when rendered non-conductive, to discontinue the application of said potential to said element, a connection between said inductive and capacitive reactive elements providing for the interchange of energy between said elements, normally non-conductive vacuum tube means, said last-named means being operative, when non-conductive, to inhibit the flow of current in said inductive element and, when rendered conductive, to permit flow of current in said inductive element, means for rendering said first-named vacuum tube means non-conductive and for rendering said last-named vacuum tube means simultaneously conductive to permit free oscillatory interchange of energy between said reactive elements while said first and last-named vacuum tube means are respectively non-conductive and conductive, and means for returning said two vacuum tube means to their normal conductive and non-conductive conditions respectively, whereby promptly to inhibit said oscillatory energy interchange and to restore said capacitive element to its normal condition of energy storage.

5. A signal generator according to claim 3 including means operative a predetermined time after the actuation of said potential-applying and current-inhibiting means to restore said means to their normal conditions.

6. In a signal generator according to claim 4, a condenser, means responsive to the rendering non-conductive of said normally conductive vacuum tube means for initiating a progressive alteration in charge on said condenser, and means responsive to the alteration in potential across said condenser resulting from said alteration in charge for restoring said normally conductive and said normally non-conductive vacuum tube means to their normal conditions a predetermined time after the rendering non-conductive of said normally conductive vacuum tube means.

7. In a cathode ray system, a cathode ray tube, said tube comprising a screen, means for producing an electron beam directed along an axis which intercepts said screen, and a pair of substantially orthogonal beam deflecting elements, means initially biasing each of said deflecting elements with equal potentials to produce substantially equal deflection of said beam in mutually perpendicular directions away from said axis, the biasing of each of said elements being insufficient in itself to deflect said beam off said screen, but the biasing of both of said elements being sufficient cooperatively to deflect said beam off said screen, and means actuatable to apply to said deflecting elements damped sinusoidally varying deflecting signals in substantial phase-quadrature relationship commencing at the time of actuation of said means, the maximum amplitude of each of said deflecting signals being such as to produce deflections substantially equal to the deflections produced by said initial biasing, application of said deflection signals causing said beam to trace upon said screen a substantially spiral path commencing at a point near the boundary of said screen substantially immediately following the actuation of said means.

ALLEN C. MUNSTER.
DAVID E. SUNSTEIN.

REFERENCES CITED

The following references are of record in the file of this patent:

UNITED STATES PATENTS

| Number | Name | Date |
| --- | --- | --- |
| 2,181,309 | Andrieu | Nov. 28, 1939 |
| 2,300,999 | Williams | Nov. 3, 1942 |
| 2,307,237 | Rea et al. | Jan. 5, 1943 |
| 2,408,414 | Donaldson | Oct. 1, 1946 |

FOREIGN PATENTS

| Number | Country | Date |
| --- | --- | --- |
| 406,903 | Great Britain | Mar. 8, 1934 |